United States Patent
Laberteaux et al.

(10) Patent No.: US 9,461,827 B2
(45) Date of Patent: Oct. 4, 2016

(54) METHOD FOR DISTRIBUTING A LIST OF CERTIFICATE REVOCATIONS IN A VANET

(75) Inventors: Kenneth P. Laberteaux, Ann Arbor, MI (US); Yih-Chun Hu, Urbana, IL (US); Jason Haas, Urbana, IL (US)

(73) Assignees: Toyota Motor Engineering & Manufacturing North America, Inc., Erlanger, KY (US); The Board of Trustees, University of Illinois at Urbana-Champaign, Champaign, IL (US)

( * ) Notice: Subject to any disclaimer, the term of this patent is extended or adjusted under 35 U.S.C. 154(b) by 1837 days.

(21) Appl. No.: 12/082,589

(22) Filed: Apr. 11, 2008

(65) Prior Publication Data

US 2009/0260057 A1 Oct. 15, 2009

(51) Int. Cl.
*H04L 29/06* (2006.01)
*H04L 9/32* (2006.01)
*H04L 29/08* (2006.01)

(52) U.S. Cl.
CPC ......... *H04L 9/3268* (2013.01); *H04L 63/0823* (2013.01); *H04L 67/12* (2013.01); *H04L 2209/84* (2013.01)

(58) Field of Classification Search
None
See application file for complete search history.

(56) References Cited

U.S. PATENT DOCUMENTS

| | | | | |
|---|---|---|---|---|
| 5,960,083 | A * | 9/1999 | Micali | G06Q 20/02 380/30 |
| 6,092,201 | A * | 7/2000 | Turnbull | G06F 21/51 380/231 |
| 6,901,509 | B1 * | 5/2005 | Kocher | H04L 9/3236 713/156 |
| 7,069,252 | B2 * | 6/2006 | Ishimi et al. | 705/76 |
| 7,120,793 | B2 * | 10/2006 | Hope | H04L 9/3268 713/158 |
| 7,337,315 | B2 * | 2/2008 | Micali | 713/157 |
| 7,526,644 | B2 * | 4/2009 | Kocher | 713/158 |
| 7,568,114 | B1 * | 7/2009 | Schlafly | 713/194 |
| 7,734,050 | B2 * | 6/2010 | Tengler | H04L 9/3263 380/264 |
| 7,742,603 | B2 * | 6/2010 | Tengler et al. | 380/270 |
| 7,743,248 | B2 * | 6/2010 | Bisbee et al. | 713/158 |
| 8,032,743 | B2 * | 10/2011 | Asay et al. | 713/156 |
| 8,438,388 | B2 * | 5/2013 | Thomas et al. | 713/168 |
| 2008/0232583 | A1 * | 9/2008 | Di Crescenzo | H04L 9/002 380/44 |
| 2009/0235071 | A1 * | 9/2009 | Bellur | H04L 9/3268 713/158 |
| 2009/0249062 | A1 * | 10/2009 | Thomas | H04L 63/0823 713/158 |

OTHER PUBLICATIONS

Papadimitratos, P.; Buttyan, L.; Hubaux, J-P.; Kargl, F.; Kung, A.; Raya, M. Architecture for Secure and Private Vehicular Communications. 2007 7th International Conference on Its Telecommunications. http://ieeexplore.ieee.org/stamp/stamp.jsp?tp=&arnumber=4295890.*

Leinmuller, Tim; Schoch, Elmar; Maihofer, Christian. Security Requirements and Solution Concepts in Vehicular Ad Hoc Networks. 2007 Fourth Annual Conference on Wireless on Demand Network Systems and Services. http://ieeexplore.ieee.org/stamp/stamp.jsp?tp=&arnumber=4142712.*

Y-C Hu and K. Laberteaux, Strong VANET Security on a Budget, Presented at ESCAR 2006 Workshop. 9 pages.

* cited by examiner

*Primary Examiner* — Jeremiah Avery

(74) *Attorney, Agent, or Firm* — Dinsmore & Shohl LLP

(57) ABSTRACT

In a vehicle-to-vehicle wireless communication system utilizing certificates to verify trustworthiness of received communications, a method for distributing a list of certificate revocations to vehicles in the communication system. At least one main station transmits a list of certificate revocations to at least one vehicle and the vehicle thereafter transmits the list of certificate revocations to other vehicles in the communication network. Each of the other vehicles in the communication network updates its list of certificate revocations in response to the receipt of the list of certificate revocations from another vehicle in the system. The other vehicles thereafter transmit their updated list of certificate revocations to other vehicles in the system.

12 Claims, 1 Drawing Sheet

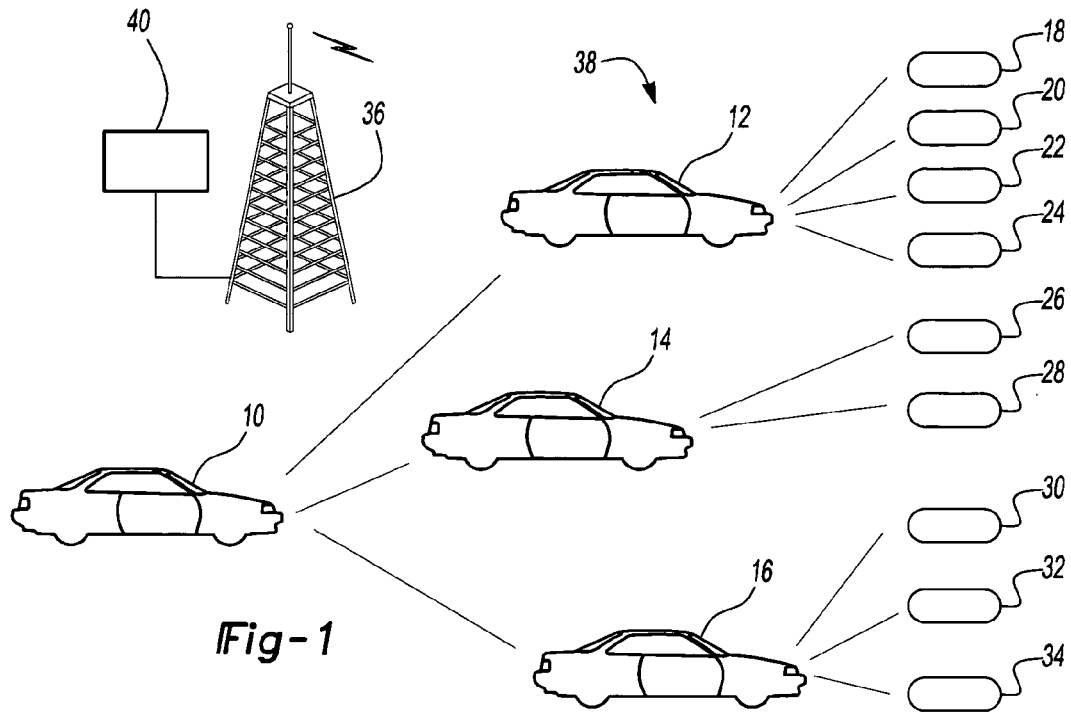
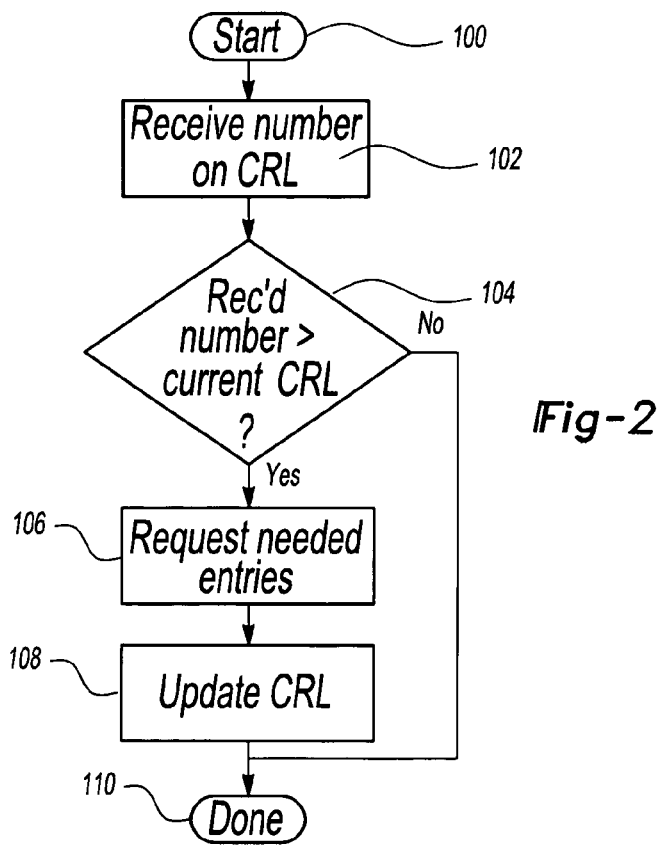

METHOD FOR DISTRIBUTING A LIST OF CERTIFICATE REVOCATIONS IN A VANET

BACKGROUND OF THE INVENTION

I. Field of the Invention

The present invention relates generally to vehicle-to-vehicle communication systems and, more particularly, to a method for distributing a list of certificate revocations to vehicles in the communication system.

II. Description of Related Art

On an average day, hundreds of people are killed and thousands injured in automotive accidents. This in turn results in a huge expenditure of healthcare dollars for treating those injured in such automotive accidents.

Many automotive accidents, however, are preventable if the vehicle driver is warned of a hazardous driving condition, or the vehicle itself reacts automatically to such a hazardous condition. For example, a driver may cause a chain reaction accident by rapidly applying his or her brakes in order to avoid a collision with a deer or other animal. The drivers behind the vehicle about to strike the animal, however, are unable to brake sufficiently rapidly in order to avoid an accident thus resulting in a chain reaction accident. However, such an accident may theoretically be prevented, or at least the injuries and/or vehicular damages minimized, if the driver and/or vehicle potentially involved in the accident are able to react sufficiently rapidly to hazardous driving conditions in the vicinity.

For that reason, dedicated short range communications (DSRC) have been proposed to permit communication between automotive vehicles as well as vehicles and infrastructure for safety and other communications. Indeed, the federal government in the United States has allocated 75 megahertz of the wireless spectrum in the 5.9 gigahertz range for such communications.

In managing the wireless communication between different vehicles, as well as between vehicles and infrastructure, the authenticity of the received messages is paramount. Without such authentications, the vehicles may receive wireless communications from parties who intentionally transmit incorrect information for whatever private purpose, as well as vehicles that, through malfunction, transmit incorrect information. Without authentication of the reliability of the received messages, unsafe traffic conditions, traffic congestion, etc. may result.

In order to enable automotive vehicles to communicate between themselves and optionally infrastructure, it has been previously proposed to form a vehicle ad hoc network (VANET) with the automotive vehicles that are within range of interest for the automotive vehicle and in which each automotive vehicle forms one node in the network. Such vehicles would then communicate amongst themselves within the network providing safety information, such as the status or status of operation of each vehicle in the network as well as infrastructure adjacent the road.

In order to ensure authenticity of the messages received by vehicle nodes within the network, it has been previously proposed to use public key infrastructure (PKI) authentication of messages transmitted over the ad hoc network. At the root of a PKI is a trusted Certificate Authority (CA). This certificate authority may be a government agency or its proxy. One of the responsibilities of a CA is to clearly distinguish between trusted and non-trusted nodes. To the trusted nodes, the CA gives one or more certificates (a single vehicle may use more than one certificate in order to improve its privacy). Each certificate imparts the trust of the CA to the owner of the certificate. A node V1 wanting to validate the authenticity of another node (V2)'s messages must have a certificate for V2. Certificates can be pre-installed or exchanged at the time of first meeting. Other certificate exchange methods have also been proposed. Node V1 can authenticate the validity of the certificate of V2. If V2's certificate is valid, V1 can then trust V2.

In one example, the certificate comprises (at least) a certificate ID, which for all practical purposes, also becomes a pseudonym for the certificate owner, as well as a public key associated with this certificate ID, as well as the certificate authority's digital signature binding this association.

In some situations, the CA may come to distrust a node V3. This may occur if there is evidence that V3 is sending inaccurate information, either due to direct manipulation of the VANET equipment, or because of a malfunction. When this happens, the CA must revoke the certificates it previously gave to V3. One method for doing this is to create a Certificate Revocation List (CRL), and then widely propagate the CRL throughout the network of nodes. Once the certificate authority revokes a certificate, and other vehicle nodes in the VANET are advised of that revocation, future messages received validated with the revoked certificate should be distrusted (and possibly disregarded).

Consequently, in order to ensure the trustworthiness of inter-vehicle messages received within the VANET, it is necessary that a list of all certificates that have been revoked not only be maintained, but also rapidly propagated throughout the entire vehicle communication system which includes all of the VANETs. One previously known proposal to accomplish this has been to provide roadside equipment (RSE) at numerous locations along the roads throughout the entire area encompassing the vehicle communication system, e.g. the United States. Such RSEs would transmit repeatedly a list identifying the certificate authentications or signatures that have been revoked by the certificate authority. This list would then be received by vehicles passing nearby the RSE and those vehicles would then update their list of certificate revocations so that any subsequent message received from a vehicle node having a revoked certificate will be disregarded.

The major disadvantage of utilizing numerous RSEs throughout the area of the communication network is the enormous cost of not only building the RSEs and installing them at numerous spaced locations adjacent roads in the area of the communication network, but also the cost of both maintaining and operating the RSEs.

A still further disadvantage of utilizing numerous RSEs to update the list of certificate revocations in automotive vehicle nodes passing nearby such RSEs, is that some vehicles may pass near an RSE on only rare occasions, if ever. As such, the list of certificate revocations maintained by such vehicles will necessarily be outdated most of the time. Consequently, messages received from vehicle nodes having a revoked certificate may still be treated as trustworthy from the receiving vehicle with the outdated list of certificate revocations thus creating safety hazards and other undesirable effects.

SUMMARY OF THE PRESENT INVENTION

The present invention provides a method for distributing a list of certificate revocations to the various vehicles in a communication system which overcomes the above-mentioned disadvantages of the prior art.

In brief, at least one, and possibly several, main station transmitters transmit a list of certificate revocations to at least one vehicle. More typically, however, a main station transmits the list of certificate revocations to all vehicles within the vicinity of the main station. The list of certificate revocations transmitted by the main station, furthermore, is periodically updated by the certificate authority and both continually and repeatedly transmitted by the main station through roadside equipment.

The vehicle or vehicles receiving the list of certificate revocations from the main station thereafter have the capability to retransmit the list of certificate revocations to other vehicles in the communication system. This vehicle-to-vehicle exchange can be triggered when one vehicle's list is more current than the other vehicles. Other schemes, such as periodic rebroadcast, are also possible. Thereafter, each of the other vehicles in the system which receives the revocation list updates its own list of certificate revocations maintained by the vehicle in response to the receipt of the list of revocations from another vehicle in the system.

These other vehicles thereafter have the capability to transmit their updated list of certificate revocations to other vehicles within the communication system, i.e. within the VANET for the vehicle, which, in turn, update their own revocation lists and retransmit the updated revocation lists and so on. In this fashion, the list of certificate revocations transmitted initially by the main station propagates throughout the entire vehicle communication network in a fashion similar to an infection until essentially all of the vehicle nodes in the system have a current or substantially current certificate revocation list.

In order to minimize both the computational time as well as bandwidth required to update the certificate of revocation list, each of the vehicle nodes within the network that receive the version identification of the certificate revocation list from another vehicle will compare the received version with its own version. Thereafter, the vehicle will update its own list of revoked certificates by merely adding the missing revoked certificates on its list.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a diagrammatic view illustrating a vehicle-to-vehicle as well as vehicle-to-infrastructure network; and FIG. 2 is a flowchart illustrating one aspect of the present invention.

DETAILED DESCRIPTION OF A PREFERRED EMBODIMENT OF THE PRESENT INVENTION

With reference first to FIG. 1, an exemplary vehicle ad hoc network (VANET) is illustrated with a number of vehicles 10-34. Each vehicle forms one node in the VANET in which the vehicles 10-34 communicate by dedicated short range wireless communication, typically in the 5.9 gigahertz range in the United States, not only between the other vehicles 10-34, but also with roadside equipment 36. Such roadside equipment 36 is stationary and communicates with vehicles 10-34 as the vehicles pass near the roadside equipment 36. Furthermore, each VANET is geographically localized to a relatively small area surrounding each vehicle and all of the VANETs together form a vehicle communication system 38.

The vehicles 10-34 may communicate with each other and the roadside equipment 36 using public key infrastructure (PKI) encryption and authentication. Such encryption and authentication is desirable not only to ensure the privacy of the occupants of the vehicles 10-34 but also to verify the trustworthiness of the communication between the vehicles 10-34.

In a PKI encryption system, a certificate authority, such as a governmental body or its proxy, distributes a public key of the certificate authority to all the vehicles 10-34 or nodes within the overall communication system 38. The certificate authority also distributes a certificate created with the private key of the certificate authority to each vehicle 10-34 in the vehicle communication system 38. Furthermore, the certificate authority may provide numerous different certificates to each vehicle 10-34 in the communication system 38 to enhance the overall privacy and security of the system 38. In some cases, the certificate has an expiration date, after which it is no longer valid.

In the well-known fashion each vehicle exchanges one of its certificates with the other nodes with whom it wishes to securely communicate. These certificates can be exchanged upon first meeting, and optionally cached. Alternatively, vehicles can obtain certificates for other vehicles through pre-installation or other means. This certificate includes a signature which can only feasibly be created by the Certificate Authority (or more precisely, by knowing the Certificate Authority's secret key). Each node in the network can validate the authenticity of this signature by using the Certificate Authority's widely distributed public key.

As an example, a signature may be validated as follows: When vehicle 12 receives a certificate from vehicle 10, vehicle 12 authenticates the signature within the certificate by decrypting the signature using the certificate authority public key, and then compares the decrypted message with the received message, or more typically with a hash function of the received message. If a match results, the signature is considered valid. Otherwise, it is discarded.

The certificate that vehicle 10 shares with vehicle 12 comprises (at least) a pseudonym for vehicle 10 as well as a public key for vehicle 10. In addition, the Certificate includes the aforementioned signature binding the pseudonym of vehicle 10 to vehicle 10's public key. This signature represents the fact that the Certificate Authority believes that vehicle 10 is a trusted node, and that the public key in the certificate does in fact belong to vehicle 10. Stated more precisely, this indicates that the Certificate Authority attests that vehicle 10 knows the secret key corresponding to the public key in the certificate.

In addition to checking the validity of the Certificate Authority's signature, the node must check to see if the certificate has been revoked, i.e. is a member of the node's copy of the Certificate Revocation List (CRL). If the certificate is not on the CRL, and the CA's signature is validated, the receiving vehicle will accept this certificate. This acceptance continues until the certificate is subsequently revoked or if its expiration date is passed.

After certificates have been shared and verified by other nodes, messages can be sent in a secure method. Consider the case when vehicle 10 and vehicle 12 wish to communicate securely, and therefore exchange and verify certificates. Vehicle 10 can then encrypt a message for vehicle 12 by encrypting it with vehicle 12's public key (obtained from vehicle 12's certificate). Alternatively, vehicle 10 can send a message with an authentication signature. This signature can be validated by vehicle 12 using vehicle 10's public key (from vehicle 10's certificate). From this validation step, vehicle 12 learns that the message is in fact from vehicle 10 (and not an imposter for vehicle 10). Further vehicle 12 learns that the contents of the message have not been altered in flight (since only vehicle 10, and not an imposter of vehicle 10, can create such a signature).

In some situations, the wireless transmissions from one or more vehicles 10-34 within the communication system 38 lose their trustworthiness so that the messages transmitted by the vehicle should no longer be trusted. The loss of trustworthiness may result, for example, from equipment malfunction, deliberate malfeasance on the part of the owner of the vehicle in the communication system as well as for other reasons. In any event, in order to ensure the security of the communication system 38, it is necessary for the certificate authority to revoke the certificate issued to any of the vehicles 10-34 which are no longer trustworthy. Once the certificate from the certificate authority has been revoked and this revocation communicated to other vehicles in the communication system 38, messages received from the untrustworthy vehicle will no longer be trusted and possibly disregarded.

In order to distribute a list of certificates that have been revoked, the certificate authority maintains a certificate revocation list at a main station 40. This main station 40 is operatively connected with the roadside equipment 36 to periodically and repeatedly transmit the certificate revocation list from the roadside equipment 36.

Automotive vehicles, such as the vehicle 10 illustrated in FIG. 1, passing near the roadside equipment 36 receives the certificate revocation list from the main station 40 and stores the list within the vehicle 10. Thereafter, the vehicle 10 transmits the certificate revocation list to other vehicles in the VANET for the vehicle 10, i.e. within the vicinity of the vehicle 10. These other vehicles 12-16 likewise receive the list from the vehicle 10 and store or update their own certificate revocation list. These vehicles 12-16, in turn, transmit the certificate revocation list to other vehicles 18-34 in their VANETs which in turn store or update their own certificate revocation lists and so on.

In this fashion, the certificate revocation list originally transmitted by the main station 40 through the roadside equipment 36 propagates throughout the entire vehicle communication network 38 in a fashion similar to the propagation of an infection with each vehicle not only receiving the certificate revocation list from other vehicles, but thereafter transmitting that list to still other vehicles in their VANET which come near or in communication range with the "infected" vehicle.

Consequently, with only the use of one or a limited number of main stations 40 and roadside equipment 36, it is possible to propagate the certificate revocation list rapidly throughout the entire vehicle communication system 38. For example, with a main station 40 positioned in only a limited number of major cities, such as New York, Boston, Chicago, Los Angeles and Houston, the propagation of the certificate revocation list is expected to be achieved within a few days.

In order to limit the computing overhead as well as the bandwidth required to propagate the certification revocation list, preferably each vehicle node in the communication system 38 merely updates its own certificate revocation list to add new entries to that list as such new entries are received from other automotive vehicles which join the VANET. This, furthermore, may be achieved in several different fashions.

For example, the certificate authority may assign a sequential number to each certificate revocation in the certificate revocation list to designate its version. For example, assuming that the current certificate revocation list contains 1,000 entries, the certificate revocation list (CRL) may be encoded as follows:

$[ID_1, ID_2, \ldots, ID_{1000}, sig_{CA}(h(ID_1|ID_2|\ldots|ID_{1000}))]$ where h( ) is a hash function, | connotes concatenation and $sig_{CA}$ is the signature created by the private key of the certificate authority. Let's now consider a case where vehicle 10, having this most current version of the CRL encounters vehicle 12. Vehicle 10 has all 1000 values in its local copy of the CRL, while Vehicle 12 has only the first 997 values in its local copy of the CRL so its CRL is $[ID_1, ID_2, \ldots, ID_{997}, sig_{CA}(h(ID_1|ID_2|\ldots|ID_{997}))]$ The transmitting vehicle 10 advertises that its CRL is of size 1000. The receiving vehicle 12 advertises that its CRL is of size 997. The transmitting vehicle 10 deduces that the receiving vehicle needs the last three values of its CRL. It therefore transmits these three IDs as well as the signature over all entries:

$[ID_{998}, ID_{999}, ID_{1000}, sig_{CA}(h(ID_1|ID_2|\ldots|ID_{1000}))]$

The receiving vehicles 12 can then check the CA signature by verifying $Sig_{CA}(h(ID_1|ID_2|\ldots|ID_{1000}))$ since the receiving vehicle 12 already has values $ID_1$, $ID_2, \ldots, ID_{997}$. If the signature is verified, it updates its CRL to be identical to the infector's:

$[ID_1, ID_2, \ldots, ID_{1000}, Sig_{CA}(h(ID_1|ID_2|\ldots|ID_{1000}))]$ and begins to advertise its CRL size to be 1000.

Consequently, when a vehicle 10-34 within the communication system 38 receives the certificate revocation list and decodes that list using the public signature of the certificate authority, the receiving vehicle will know that the received certificate revocation list contains 1,000 entries. Assuming, however, that the certificate revocation list maintained by the receiving vehicle has only 997 entries, the receiving vehicle merely adds the final three entries from the received certificate revocation list, appends the last three entries to its own list so that its list is updated to 1,000 entries and then saves the now updated certificate revocation list. Alternatively, the transmitting station may simply transmit an encoded message indicating the number of entries on its certificate revocation list, in this example 1,000. The receiving vehicle then compares the number of entries from the transmitting vehicle with the number of entries in its own certificate revocation list, in this example 997, and then requests that the transmitting station transmits only the final three entries on the certificate revocation list. Upon receipt of those final three entries, the receiving station updates its certificate revocation list to 1,000 entries, and so on. In this fashion, significant bandwidth may be conserved.

Other methods for determining the version of the CRL include using sequential version numbers and using sequential time/date-stamps. Still other protocols may also be utilized.

These examples are consistent with a CRL that monotonically increases in the number of its entries. If instead a CRL is pruned, e.g. of certificates that have passed their expiration date, suitable extensions can be directly created.

With reference now to FIG. 2, this latter method for updating the certificate revocation list is shown in greater detail. After the procedure starts at step 100, step 100 proceeds to step 102. At step 102, the vehicle receives the number of entries on the certificate revocation list from a transmitting vehicle. Step 102 then proceeds to step 104.

At step 104, the receiving vehicle compares the number of entries on the certificate revocation list from step 102 and compares it with the number of entries on its own certificate revocation list. If the number received at step 102 is greater than the number of entries on its own certificate revocation list, step 104 proceeds to step 106.

At step 106, the vehicle requests the number of entries, in this example three, needed to complete its own certificate revocation list from the transmitting vehicle. This transmission is accomplished wirelessly through dedicated short range communication. Step 106 then proceeds to step 108.

At step 108, the vehicle receives the necessary entries for its certificate revocation list needed to update its list to at least the state of the transmitting vehicle. The updated certificate revocation list is then stored by the vehicle in any conventional fashion and step 108 then proceeds to step 110 where the procedure is completed.

Conversely, if the received number of items on the certificate revocation list is less than the number of entries on the certificate revocation list maintained by the vehicle, step 104 instead branches directly to step 110 where the procedure is completed.

Consequently, it can be seen that by only transmitting the necessary entries on the certificate revocation list, not only is bandwidth, but also processing overhead, conserved.

Although the invention has been disclosed for distributing a certificate revocation list, it may also be used to propagate other information, such as system maintenance information, weather information, traffic information, recall notice information and the like.

From the foregoing, it can be seen that the present invention provides a highly effective method for propagating a list of certificate revocations between vehicles in a vehicle-to-vehicle communication system having a plurality of VANETs. Having described our invention, however, many modifications thereto will become apparent to those skilled in the art to which it pertains without deviation from the spirit of the invention as defined by the scope of the appended claims.

We claim:

1. In a vehicle-to-vehicle communication system utilizing certificate(s) to verify trustworthiness of received communications, a method for distributing a list of certificate revocations to vehicles in the communication system comprising the steps of:
    a main station transmitting at a frequency a list of certificate revocations to at least one vehicle in a vicinity of said main station and within radio communication at said frequency,
    said at least one vehicle thereafter transmitting said list of certificate revocations to other vehicles in the communication system when said vehicle is outside said vicinity of said main station and outside radio communication with said main station at said frequency,
    each of said other vehicles updating its list of certificate revocations in response to the receipt of the list of certificate revocations from another vehicle in the system, and
    said other vehicles thereafter transmitting their updated list of certificate revocations to other vehicles in the system outside said vicinity of said main station and outside radio communication with said main station at said frequency.

2. The method as defined in claim 1 wherein said updating step further comprises the steps of:
    each individual vehicle comparing the received list of certificate revocations received from another vehicle with the list of certificate revocations currently maintained by the individual vehicle,
    the individual vehicle thereafter updating the list of certificate revocations maintained by the individual vehicle by adding received certificate revocations not currently on the list of certificate revocations to the list of certificate revocations maintained by the individual vehicle.

3. The method as defined in claim 2 and further comprising the steps of:
    said at least one main station assigning a sequential number to each certificate revocation in the list transmitted by said at least one main station,
    each individual vehicle in the system maintaining a count of the number of certificate revocations in the list of certificate revocations maintained by said each individual vehicle,
    said updating step comprising the step of each individual vehicle adding only received certificate revocations to the list of certificate revocations maintained by the vehicle which exceed the count maintained by said individual vehicle.

4. The method as defined in claim 3 wherein said main station transmitting step further comprises the step of transmitting a sequential number associated with each certificate revocation in the transmitted list of certificate revocations.

5. The method as defined in claim 1 and further comprising the step of encrypting said list of certificate revocations prior to transmission by said main station.

6. The method as defined in claim 1 and further comprising the step of encrypting said list of certificate revocations prior to transmission by said vehicles.

7. A method for distributing information to vehicles in a vehicle-to-vehicle communication system comprising the steps of:
    a main station transmitting at a frequency information to at least one vehicle in a vicinity of and in radio communication with said main station at said frequency,
    said at least one vehicle thereafter periodically transmitting said information to other vehicles in the communication system when said vehicle is outside said vicinity of said main station and outside radio communication with said main station at said frequency,
    each of said other vehicles updating its information in response to the receipt of the information from another vehicle in the system, and
    said other vehicles thereafter periodically transmitting its updated information to other vehicles in the system outside said vicinity of said main station and outside radio communication with said main station at said frequency.

8. The method as defined in claim 7 wherein said updating step further comprises the steps of:
    each individual vehicle comparing the received information with the information currently maintained by the individual vehicle,
    the individual vehicle thereafter updating the information maintained by the individual vehicle by adding received information not currently on the information to the information maintained by the individual vehicle.

9. The method as defined in claim 8 and further comprising the steps of:
    said at least one main station assigning a sequential number to each item of information transmitted by said at least one main station, each individual vehicle in the system maintaining a count of the number of items in the information maintained by said each individual vehicle, said updating step comprising the step of each individual vehicle adding only received items of information to the list of information maintained by the vehicle which exceed the count maintained by said individual vehicle.

10. The method as defined in claim 9 wherein said main station transmitting step further comprises the step of transmitting a sequential number associated with each item of information in the transmitted list of items of information.

11. The method as defined in claim 7 and further comprising the step of encrypting said information prior to transmission by said main station.

12. The method as defined in claim 7 and further comprising the step of encrypting said information prior to transmission by said vehicles.

* * * * *